Dec. 17, 1929.  H. M. R. DAM  1,739,784
ELECTRIC BATTERY
Filed Dec. 3, 1926   2 Sheets-Sheet 1
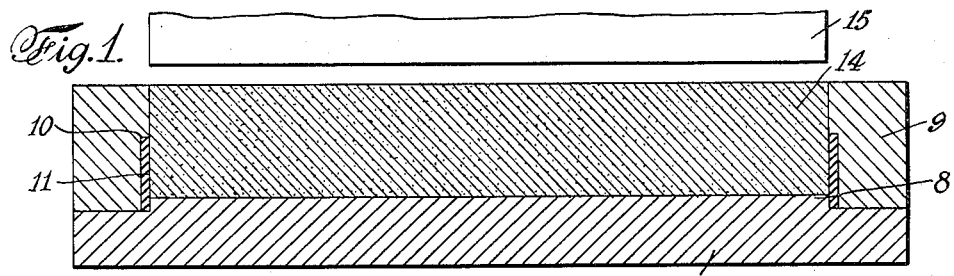
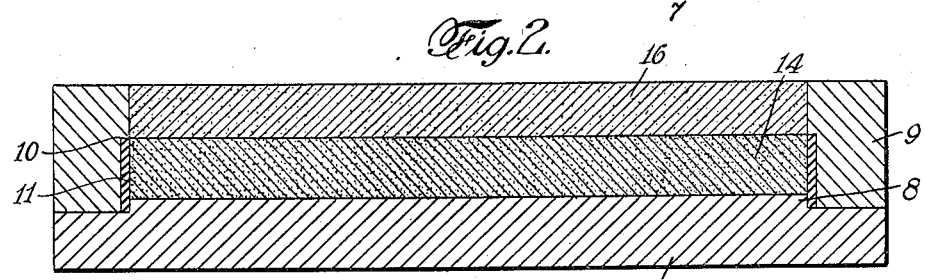
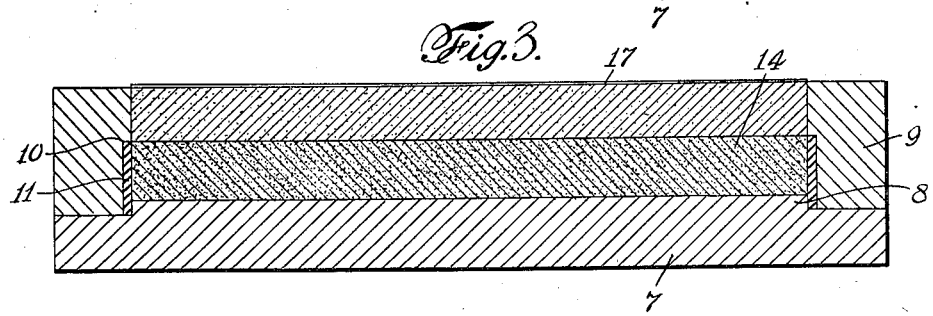
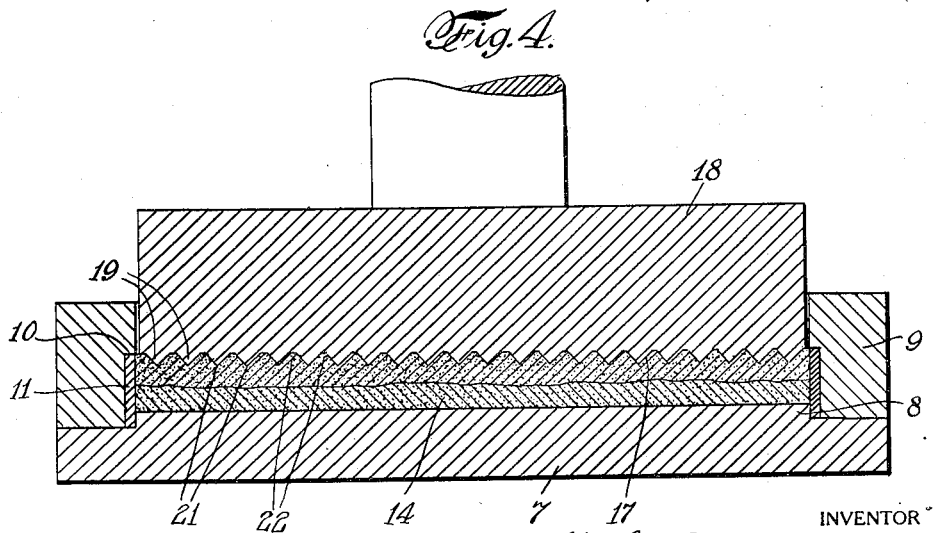

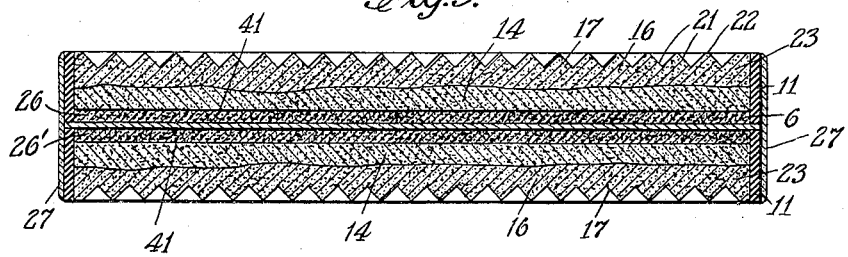
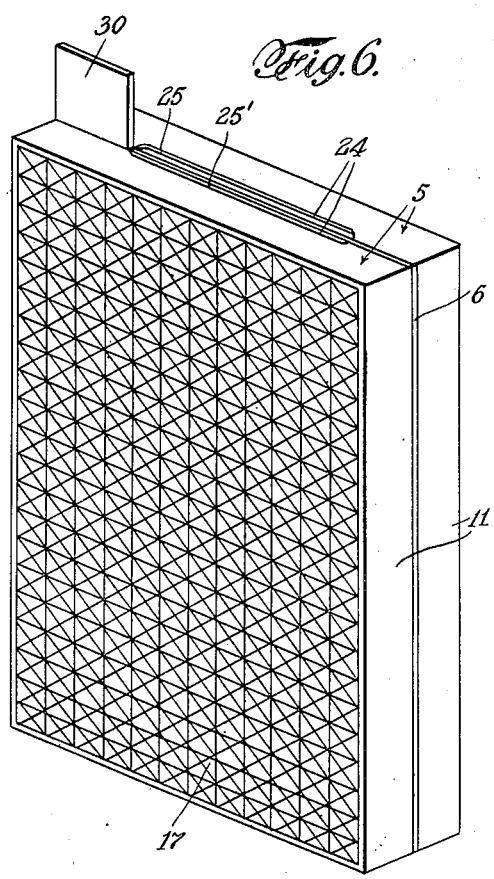
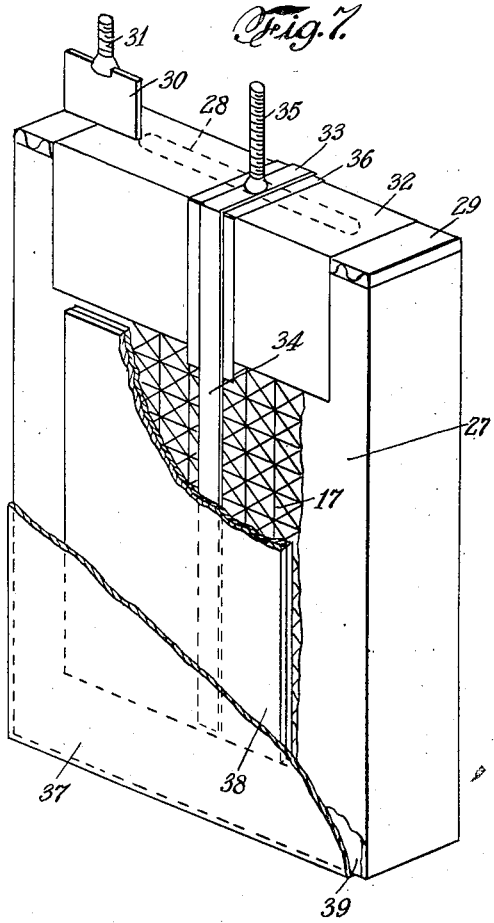

Patented Dec. 17, 1929

1,739,784

UNITED STATES PATENT OFFICE

HENRY M. ROSENDAL DAM, OF BROOKLYN, NEW YORK, ASSIGNOR TO PREMO ELECTRIC CORPORATION, A CORPORATION OF NEW YORK

ELECTRIC BATTERY

Application filed December 3, 1926. Serial No. 152,370.

This invention relates to electric batteries of the flat cell type.

A general object of the invention is to provide an improved battery of the character mentioned, which is so constructed as to enable it to be expeditiously manufactured, and in which a space is provided, intermediate the depolarizing mixture and one of the electrodes, adapted for the retention of an electrolyte.

Other objects and advantages of the invention will become apparent from the following description, taken in connection with the accompanying drawings, in which Figure 1 is a transverse, sectional view of a mold adapted to be used in the manufacture of cell units entering into the battery, the mold being shown as carrying a frame and filled with a quantity of depolarizing mixture to be compressed into the frame; Figure 2 is a view similar to Figure 1, showing the depolarizing mixture as having been initially compressed into the frame, and also showing a quantity of carbonaceous material, in the mold above the depolarizing mixture to be compressed into the frame incident to final compression of the depolarizing mixture; Figure 3 is a view similar to Figure 2 and showing a metallic facing as having been placed upon the carbonaceous material subsequent to the heating thereof; Figure 4 is a transverse sectional view through the mold, showing the depolarizing mixture as having undergone final compression and the carbonaceous material as having been compressed into the frame; Figure 5 is a transverse sectional view of the battery, showing the electrolyte therein; Figure 6 is a perspective view of a partially assembled battery; and Figure 7 is a fragmentary perspective view showing the relation of the various battery parts to each other when placed within a cardboard or other suitable container.

The battery herein shown comprises a pair of cell units 5, common to a negative electrode 6, to opposite faces of which the cell units are physically united.

The cell units may be formed in a suitable mold, herein shown as comprising a base plate 7, having a raised portion 8 around which is adapted to be placed a chase 9, which is cut away, as shown at 10, to provide a pocket adapted for the reception of a suitable frame 11 of insulating material, such as cardboard, which may be coated or otherwise treated with a suitable substance, such as wax, to render it impervious to moisture. It will be noted that the frame 11, at its lower edge, is confined between the chase 9 and the raised portion 8 of the base plate 7. The reason for so constructing the base plate with respect to the chase 9 that the raised portion 8 thereof projects a slight distance into the frame 11, will hereinafter become apparent.

In constructing the cell units 5, the frame 11 is placed within the chase 9, as shown in Figures 1 to 4, inclusive, whereupon the chase 9 is placed in position upon the base plate 7. The mold is then filled to the level of top of the chase 9 with a suitable depolarizing mixture 14, which is then subjected to pressure, by a suitable plunger 15, and initially compressed into the frame 11, as shown in Figure 2. After initially compressing the depolarizing mixture to the level of the top of the frame 11, the mold is then filled, to the level of top of the chase 9, with a suitable carbonaceous material 16, such as graphite. In preparing the carbonaceous material, a suitable quantity of wax is mixed with it, after which the mixture is ground into powdered form, the wax being thereby equally distributed with respect to the graphite and thus serving to render the carbonaceous mass impervious to moisture after compression.

After the carbonaceous material has been introduced into the die, such material is heated, as by means of a blow torch, for the purpose of softening the wax in it in order to render the carbonaceous mass more or less plastic, thus enabling it to readily respond to the compression force to be later exerted upon it. After heating the carbonaceous material, a metallic facing, such as tinfoil 17, is placed upon the top of the carbonaceous material, as shown in Figure 3. With the tinfoil so positioned, the depolarizing mixture 14, carbonaceous material 16 and tinfoil 17 are collectively subjected to compression by means of a second plunger 18. The lower or compression face of this plunger 18 is provided with a plurality of projections such as pyramids 19 which form a plurality of complementary depressions and protuberances 21 and 22, in the foil-covered face of the carbonaceous material, which becomes, as a result of compression, a compact mass adapted to be utilized as the positive electrode 23 of a cell. This roughening of the foil-covered surface of the positive electrode 23, increases the area of the surface contact between the metallic facing 17 and such electrode, with the result that a minimum electrical resistance is offered between the metallic facing and the carbonaceous material to which it is attached.

Upon completion of the final compression, the cell unit including the frame 11, depolarizing mixture 14, the positive electrode 23, and metallic facing 17, may be removed from the mold, as a unitary structure, in which the component elements are intimately united. By reason of the fact that the raised portion 8 of the base plate 7 extends an appreciable distance into the frame 11, the depolarizing mixture 14 necessarily lies a corresponding distance from the lower edge of the frame 11.

In assembling the battery, shown in Figures 5 to 7 inclusive, a pair of units 5 are placed in a registering relation upon opposite sides of the common negative electrode 6 which may be in the form of a flat sheet of zinc. The frames 11 are cut away or notched, as shown at 24 in Figure 6, and these notches form with the electrode 6 a pair of openings 25 and 25' leading respectively into spaces 26 and 26', formed intermediate the electrode 6 and the adjacent depolarizing material 14 of each cell unit 5. These openings initially are left open, but the battery is sealed along the lines of contact between frames 11 and the extreme margin of the electrode 6 by the application of a suitable wax 27 which extends an appreciable distance over the margins of the outer faces of the positive electrodes, as shown in Figure 7. After sealing the battery as above described, a suitable electrolyte 41 is poured into the spaces 26 and 26' through the openings 25 and 25', the electrolyte being of such consistency that it will gelatinize in a relatively short period of time. After gelatinization, the electrolyte which completely fills the spaces 26 and 26', is confined within the battery by sealing the openings 25 and 25' with a suitable sealing material, such as wax 28 (Figure 7) thus rendering the battery airtight in order to preserve the same against deterioration for as long as possible.

After sealing the openings 25 and 25' a suitable spacer 29 such as corrugated pasteboard is applied to the top of the battery, the pasteboard being slotted at one end to receive the projecting wing 30 of the electrode 6, to which wing a suitable terminal 31 may be applied either before or after the battery is assembled, as shown in Figure 7. The spacer 29 may be temporarily retained in position upon the battery by a strip of adhesive material 32, opposite margins of which overlie the upper marginal faces of the positive electrodes 23 of the battery. A metallic connector 33 is then placed over the adhesive material 32, the legs 34 of the connector being adapted to engage the metallic facing 17 of each positive electrode 23. The intermediate portion of the yoke 33 carries a suitable terminal 35. If desired, a second strip 36 of adhesive material may be applied to the first strip 32 of adhesive material in such a position as to receive the yoke 33.

The battery thus far assembled may be introduced into a suitable container 37, of cardboard or other similar insulating material. In order to urge the legs 34 of the yoke 33 into intimate contact with the metallic faces 17, as many backing strips 38, of cardboard or other similar material, as may be necessary, may be introduced into the container 37 intermediate the side walls thereof and the opposite sides of the battery. These backing strips 38 are somewhat smaller in area than opposite faces of the battery, and serve to maintain the battery centrally positioned intermediate the side walls of the container 37 and, since they are somewhat smaller in area than the opposite sides of the battery, adequate space is provided for the usual sealing material such as pitch 39, which is adapted to be poured into the container 37 around the battery and over the top thereof to a point just above the top of the wing 30.

While the frames 11 are shown as being notched in order to provide openings 25 and 25', such notches may be omitted if desired, in which case the electrolyte 41 may be applied to the face of the depolarizing material 14 of each cell unit 5 before the cell units are placed in position upon opposite faces of the negative electrode 6. In thus applying the electrolyte 41 to the depolarizing material 14, a sufficient quantity of the same is employed to completely fill the spaces 26 and 26' and thereby contact with opposite faces of the electrode 7. After applying the cell units 5 to opposite faces of the electrode 7, the battery is sealed along the line of contact between the frames 11 and the extreme margins of the electrode 6 by the application of a suitable wax, as above described.

What is claimed is:

1. In a battery, a mass of carbonaceous material compressed into cake form and serving as an electrode, a mass of depolarizing material compressed into cake form upon said electrode, an electrode having a polarity opposed to that of the first named electrode and arranged adjacent said depolarizing material and forming therewith a space adapted for the reception of an electrolyte, and a frame of insulating material into which said depolarizing material and said carbonaceous material are compressed, said frame having a cut away portion forming with the second named electrode an opening through which an electrolyte may be introduced into said space.

2. A battery comprising masses of carbonaceous material compressed into cake form and serving as a pair of electrodes, masses of depolarizing material compressed into cake form upon each electrode, a third electrode having a polarity opposed to that of the electrodes of the said pair and arranged adjacent said depolarizing material and forming therewith spaces adapted for the reception of an electrolyte, and a pair of frames of insulating material into which said masses of depolarizing material and said carbonaceous material are compressed, said frames having cut away portions forming with said third electrode a pair of openings through which an electrolyte may be introduced into said spaces.

In testimony whereof, I have affixed my signature to this specification.

HENRY M. ROSENDAL DAM.